United States Patent
Widjaja et al.

(10) Patent No.: US 8,060,490 B2
(45) Date of Patent: Nov. 15, 2011

(54) ANALYZER ENGINE

(75) Inventors: Herman Widjaja, Issaquah, WA (US);
Justin A. Slone, Seattle, WA (US);
Dimitar K. Popov, Redmond, WA (US);
Mariyan D. Fransazov, Redmond, WA (US); Donny Amalo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 473 days.

(21) Appl. No.: 12/277,826

(22) Filed: Nov. 25, 2008

(65) Prior Publication Data

US 2010/0131486 A1 May 27, 2010

(51) Int. Cl.
G06F 7/06 (2006.01)
G06F 17/30 (2006.01)
G06F 7/00 (2006.01)

(52) U.S. Cl. .................................. 707/708; 707/771
(58) Field of Classification Search .................. 707/708
See application file for complete search history.

(56) References Cited

U.S. PATENT DOCUMENTS

| | | | | |
|---|---|---|---|---|
| 6,298,173 | B1* | 10/2001 | Lopresti | 382/305 |
| 6,725,426 | B1* | 4/2004 | Pavlov | 715/205 |
| 6,928,488 | B1* | 8/2005 | de Jong et al. | 709/246 |
| 7,392,349 | B1* | 6/2008 | Mathur et al. | 711/141 |
| 7,610,342 | B1* | 10/2009 | Pettigrew et al. | 709/206 |
| 7,870,123 | B2* | 1/2011 | Priyadarshi et al. | 707/718 |
| 2002/0029259 | A1* | 3/2002 | Okada | 709/219 |
| 2002/0087596 | A1* | 7/2002 | Lewontin | 707/513 |
| 2005/0028139 | A1* | 2/2005 | Togahara | 717/114 |
| 2005/0050000 | A1* | 3/2005 | Kwok et al. | 707/1 |
| 2005/0065975 | A1* | 3/2005 | McDonald | 707/104.1 |
| 2005/0132284 | A1* | 6/2005 | Lloyd et al. | 715/517 |
| 2007/0100793 | A1* | 5/2007 | Brown et al. | 707/2 |
| 2007/0101127 | A1* | 5/2007 | Butler et al. | 713/157 |
| 2007/0136334 | A1* | 6/2007 | Schleppenbach et al. | 707/101 |
| 2007/0136659 | A1* | 6/2007 | Adelberg et al. | 715/513 |
| 2007/0186152 | A1* | 8/2007 | Gurcan et al. | 715/509 |
| 2007/0203932 | A1* | 8/2007 | Gaurav et al. | 707/102 |
| 2008/0114813 | A1* | 5/2008 | Leonard et al. | 707/200 |
| 2008/0170684 | A1 | 7/2008 | Widjaja et al. | |
| 2008/0178067 | A1* | 7/2008 | Lahman et al. | 715/200 |
| 2009/0022312 | A1* | 1/2009 | Mayor et al. | 380/243 |
| 2009/0083738 | A1* | 3/2009 | Kruglick et al. | 718/100 |
| 2009/0254808 | A1* | 10/2009 | Yuan et al. | 715/234 |

(Continued)

FOREIGN PATENT DOCUMENTS

WO 2006131744 A1 12/2006

OTHER PUBLICATIONS

"Test Strategies for XPS Consumers", retrieved at <<http://download.microsoft.com/download/a/f/7/af7777e5-7dcd-4800-8a0a-b18336565f5b/QLI_WinHec06.doc>>, May 11, 2006, pp. 5.

(Continued)

Primary Examiner — Hung T Vy
Assistant Examiner — Binh V Ho

(57) ABSTRACT

Methods and systems provide a tool for searching and analyzing XPS files. In accordance with the described embodiments, a user can search and analyze XPS files without having a full understanding of an associated software development kit (SDK). Further, in at least some embodiments, the tool can load an XPS file, analyze XPS/OPC/ZIP metadata information, and store the metadata information into a set of predefined rules.

12 Claims, 8 Drawing Sheets

U.S. PATENT DOCUMENTS

2009/0282389 A1* 11/2009 Slone et al. .................. 717/124
2010/0088676 A1* 4/2010 Yuan et al. .................. 717/120

OTHER PUBLICATIONS

"XML Paper Specification", retrieved at <<http://en.wikipedia.org/wiki/XML_Paper_Specification>>, Aug. 25, 2008, pp. 3.

"Creating an Analysis Engine", retrieved at <<http://www.eclipse.org/tptp/platform/documents/tutorials/loganalyzer/LogAnalysisEngine.html>>, Aug. 25, 2008, pp. 3.

Weibel, et al., "A Model for Mapping between Printed and Digital Document Instances", retrieved at <<http://www.inf.ethz.ch/personal/signer/publications/2007-wns-doceng.pdf>>, DocEng'07, Aug. 28-31, 2007, Winnipeg, Manitoba, Canada, pp. 10.

"eDocument Library", *Copyright 2008 Global Graphics Software Ltd.*, www.globalgraphics.com,(Jan. 2008),6 pages.

* cited by examiner

ANALYZER ENGINE

BACKGROUND

XML Paper Specification (XPS) defines a data format that is built on top of Open Packaging Convention (OPC) files, which in turn is built on top of a ZIP architecture. Each of the layers—the XPS layer, the OPC layer, and the ZIP layer, can have its own characteristics and tools.

A user may desire to search for a specific type of XPS or OPC file. Typically, there are two options for the user—extract and inspect the file manually or create their own tool to do so. Manual analysis involves opening an XPS file as a ZIP file and manually inspecting the contents. Generally, manual processes can generate a high error rate. Additionally, the analysis keeps repeating over and over again for every single file. However, a user who has thorough understanding of XPS or ZIP can perform the manual analysis himself.

Alternatively, a user can create an analysis tool using an XPS or OPC Software Development Kit (SDK) to do the searching or analysis. However, that complicates the process because the tool can be expensive to create in terms of man hours used to develop the tool. Further, the user typically has to have a full understanding of the XPS or OPC SDK in order to develop and use the tool. Additionally, the user may have to create a different tool for each of the user's own purposes. For example, assume that a user wants to find a discard control. In this case, the user might create a tool in order to find the discard control. Assume further that the very next day the user desires to find a particular font. The user will then have to create an entirely new tool to find such font. This can be very expensive and time consuming.

SUMMARY

Methods and systems provide a tool for searching and analyzing XPS files. In accordance with the described embodiments, a user can search and analyze XPS files without having a full understanding of an associated software development kit (SDK). Further, in at least some embodiments, the tool can load an XPS file, analyze XPS/OPC/ZIP metadata information, and store the metadata information into a set of predefined rules.

DETAILED DESCRIPTION

Overview

Methods and systems provide a tool for searching and analyzing XPS files. In accordance with the described embodiments, a user can search and analyze XPS files without having a full understanding of an associated software development kit (SDK). Further, in at least some embodiments, the tool can load an XPS file, analyze XPS/OPC/ZIP metadata information, and store the metadata information into a set of predefined rules.

In one described embodiment, an XPS Analyzer tool performs analysis on XPS or OPC files from the XPS layer, the OPC layer, and/or the ZIP layer. This tool receives XPS and OPC files as input and then outputs a set of predefined rules that identify the file. In the discussion that follows, a first section entitled "Operating Environment" is provided that introduces an environment in which the inventive embodiments may operate. Following this, a section entitled "XPS Overview" provides an introduction to the XPS file format. After that, a section entitled "Example XPS Analyzer" provides a structural example of an XPS analysis tool. Following this, a section entitled "Implementation Example" is provided and describes but one example implementation of an analysis of an XPS file utilizing an embodiment of the XPS analysis tool. Finally, a section entitled "Example System" is provided and describes a structural example of a system in which the XPS Analyzer is utilized.

Operating Environment

Figure 1:
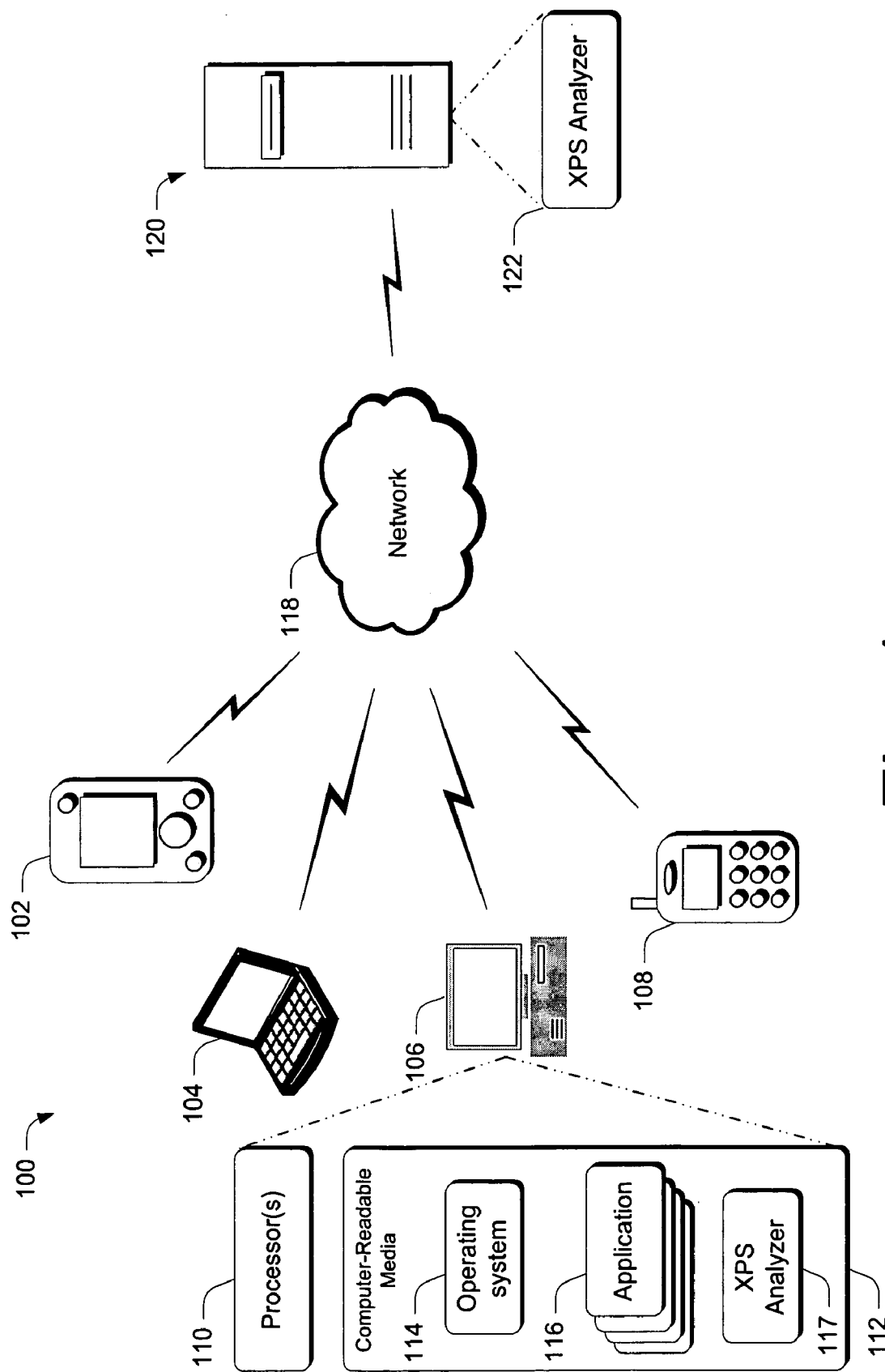
FIG. 1 illustrates an operating environment in accordance with one or more embodiments.

FIG. 1 illustrates an operating environment in accordance with one or more embodiments, generally at 100. Operating environment 100 includes multiple different computing devices, examples of which are shown at 102, 104, 106, and 108. The computing devices can be used by a user to consume content, examples of which can include content that conforms to the XPS specification described below. Individual computing devices can typically include one or more processors 110, one or more computer-readable media 112, an operating system 114 and one or more applications 116 that reside on the computer-readable media and which are executable by the processor(s).

In addition, in one or more embodiments, computer readable media 112 can include an XPS Analyzer 117 that performs analysis on XPS type files such as those described herein. For example, the XPS Analyzer tool can aid a user in searching for an XPS file with a specific syntax as described below.

The computer-readable media can include, by way of example and not limitation, all forms of volatile and non-volatile memory and/or storage media that are typically associated with a computing device. Such media can include ROM, RAM, flash memory, hard disk, removable media and the like.

In addition, in at least some embodiments, environment 100 includes a network 118, such as a local network or the Internet, via which content can be received and sent.

Content and other data or information can be received over network 118 by way of a server 120 that has access to the content and/or information associated with the content. In at least some embodiments, server 120 can include an XPS Analyzer 122 as well.

The computing devices can be embodied as any suitable computing device such as, by way of example and not limitation, a desktop computer (such as computing device 106), a portable computer (such as computing device 104), a handheld computer such as a personal digital assistant (such as computing device 102), a cell phone (such as computing device 108), and the like. One example of a computing device is shown and described below in relation to FIG. 8.

Having discussed the general notion of an example operating environment in which various embodiments can operate, consider now a discussion of XPS and the XPS document format.

XPS Overview

Various embodiments can be employed in connection with documents that conform to the XML Paper Specification (XPS) version 1.0, available from Microsoft Corporation. As background, XPS describes a set of conventions for the use of XML and other widely available technologies to describe the content and appearance of paginated documents. It is written for developers who build systems that process XPS content. One goal of XPS is to ensure the interoperability of independently created software and hardware systems that produce or consume XPS content. The XPS specification defines the formal requirements that producers and consumers satisfy in order to achieve interoperability.

In the description below, a paginated-document format called the XPS Document is described. The format requirements are an extension of the packaging requirements described in the Open Packaging Conventions (OPC) specification. The OPC specification is available, as of this writing, at:

http://www.ccma-international.org/news/
TC45_current_work/tc45-2006-334.pdf

That specification describes packaging and physical format conventions for the use of XML, Unicode, ZIP, and other technologies and specifications to organize the content and resources that make up any document. OPC is an integral part of the XPS specification.

In the discussion below, certain high level aspects of XPS are described for the purpose of providing at least some context of how the above-described principles can be employed in a tangible context. For a detailed treatment of XPS, the reader is referred to the specification referenced above.

XPS Document Format

The XPS specification describes how the XPS Document format is organized internally and rendered externally. It is built upon the principles described in the Open Packaging Conventions specification. The XPS Document format represents a set of related pages with a fixed layout, which are organized as one or more documents, in the traditional meaning of the word. A file that implements this format includes everything necessary to fully render those documents on a display device or physical medium (for example, paper). This includes all resources such as fonts and images that might be required to render individual page markings.

In addition, the format includes optional components that build on the minimal set of components required to render a set of pages. This includes the ability to specify print job control instructions, to organize the minimal page markings into larger semantic blocks such as paragraphs, and to physically rearrange the contents of the format for easy consumption in a streaming manner, among others.

Finally, the XPS Document format implements the common package features specified by the Open Packaging Conventions specification that support digital signatures and core properties.

Figure 2:
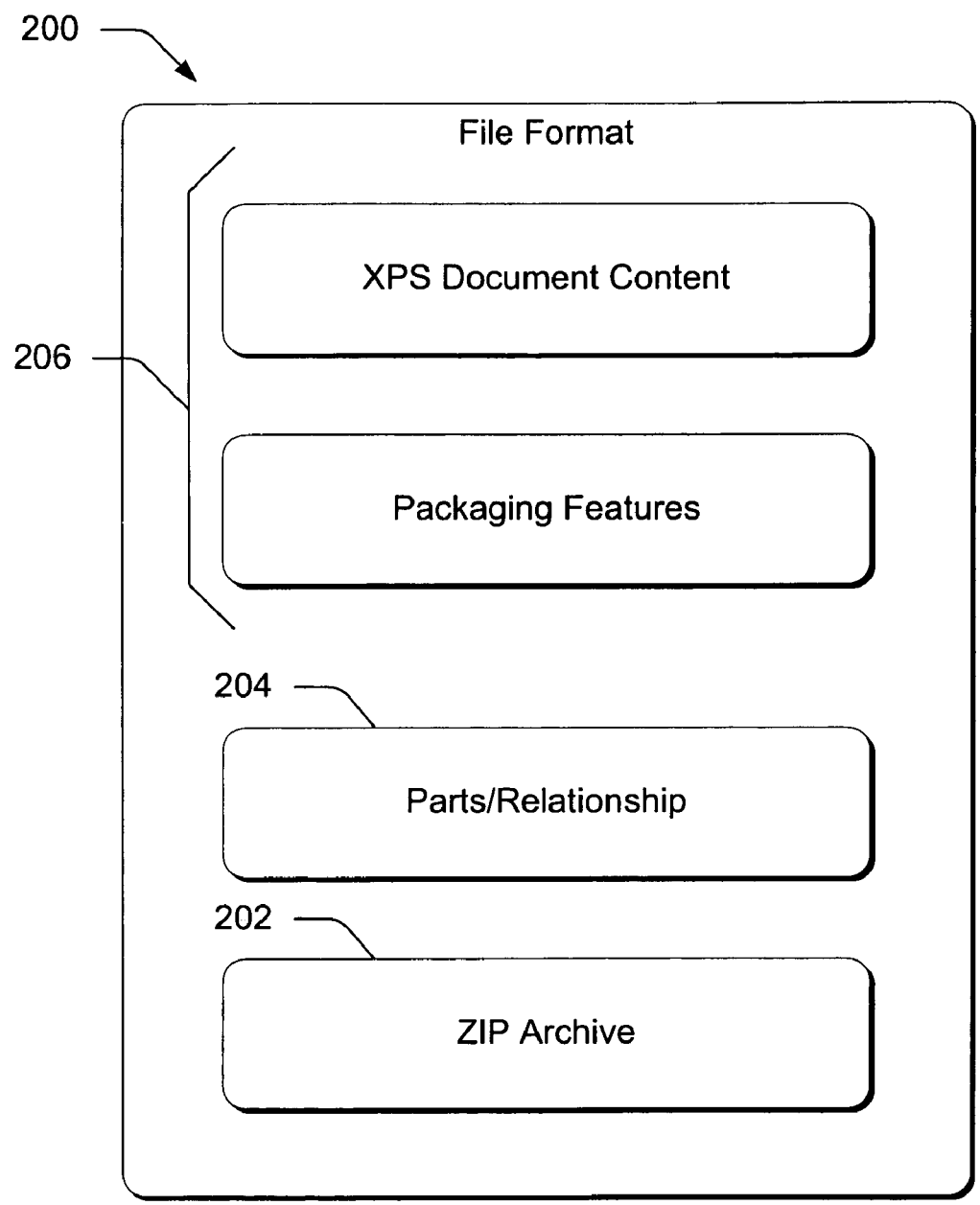
FIG. 2 shows an example XPS Document format in accordance with one embodiment.

The XPS Document format uses a ZIP archive for its physical model. The Open Packaging Conventions specification describes a packaging model, that is, how the package is represented internally with parts and relationships. An example of the XPS Document format is shown in FIG. 2 generally at 200. Format 200 includes a ZIP archive 202 which constitutes a physical representation level, a parts/relationships level 204 which constitutes a logical representation level, and a Packaging Features and XPS Document Content level 206 which constitutes the content representation level.

The specification for the ZIP archive is well-known and, for the sake of brevity, is not described in detail here. It is to be appreciated and understood that the above-described physical representation manipulations and corruptions can be applied at the ZIP archive level.

Parts/Relationships

The packaging conventions described in the Open Packaging Conventions specification can be used to carry any payload. A payload is a complete collection of interdependent parts and relationships within a package. The XPS specification defines a particular payload that contains a static or "fixed-layout" representation of paginated content: the fixed payload.

A package that holds at least one fixed payload and follows the rules described in this specification is referred to as an XPS Document. Producers and Consumers of XPS Documents can implement their own parsers and rendering engines based on this specification.

The XPS Document format includes a well-defined set of parts and relationships, each fulfilling a particular purpose in the document. The format also extends the package features, including digital signatures, thumbnails, and interleaving.

A payload that has a FixedDocumentSequence root part is known as a fixed payload. A fixed payload root is a FixedDocumentSequence part that references FixedDocument parts that, in turn, reference FixedPage parts. There can be more than one fixed payload in an XPS Document.

A specific relationship type is defined to identify the root of a fixed payload within an XPS Document: the XPS Document Startpart relationship. The primary fixed payload root is the FixedDocumentSequence part that is referenced by the XPS Document StartPart relationship. Consumers such as viewers or printers use the XPS Document StartPart relationship to find the primary fixed payload in a package. The XPS Document StartPart relationship must point to the FixedDocumentSequence part that identifies the root of the fixed payload.

The payload includes the full set of parts required for processing the FixedDocumentSequence part. All content to be rendered must be contained in the XPS Document. The parts that can be found in an XPS Document are listed in the table just below.

| Name | Description |
| --- | --- |
| FixedDocumentSequence | Specifies a sequence of fixed documents. |
| FixedDocument | Specifies a sequence of fixed pages. |
| FixedPage | Contains the description of the contents of a page. |
| Font | Contains an OpenType or TrueType font. |
| JPEG image | References an image file. |
| PNG image | |
| TIFF image | |
| Windows Media Photo image | |
| Remote resource dictionary | Contains a resource dictionary for use by fixed page markup. |
| Thumbnail | Contains a small JPEG or PNG image that represents the contents of the page or package. |
| PrintTicket | Provides settings to be used when printing the package. |
| ICC profile | Contains an ICC Version 2 color profile |

-continued

| Name | Description |
| --- | --- |
|  | optionally containing an embedded Windows Color System (WCS) color profile. |
| DocumentStructure | Contains the document outline and document contents (story definitions) for the XPS Document. |
| Story Fragments | Contains document content structure for a fixed page. |
| SignatureDefinitions | Contains a list of digital signature spots and signature requirements. |
| DiscardControl | Contains a list of resources that are safe for consumers to discard during processing. |

Figure 3:
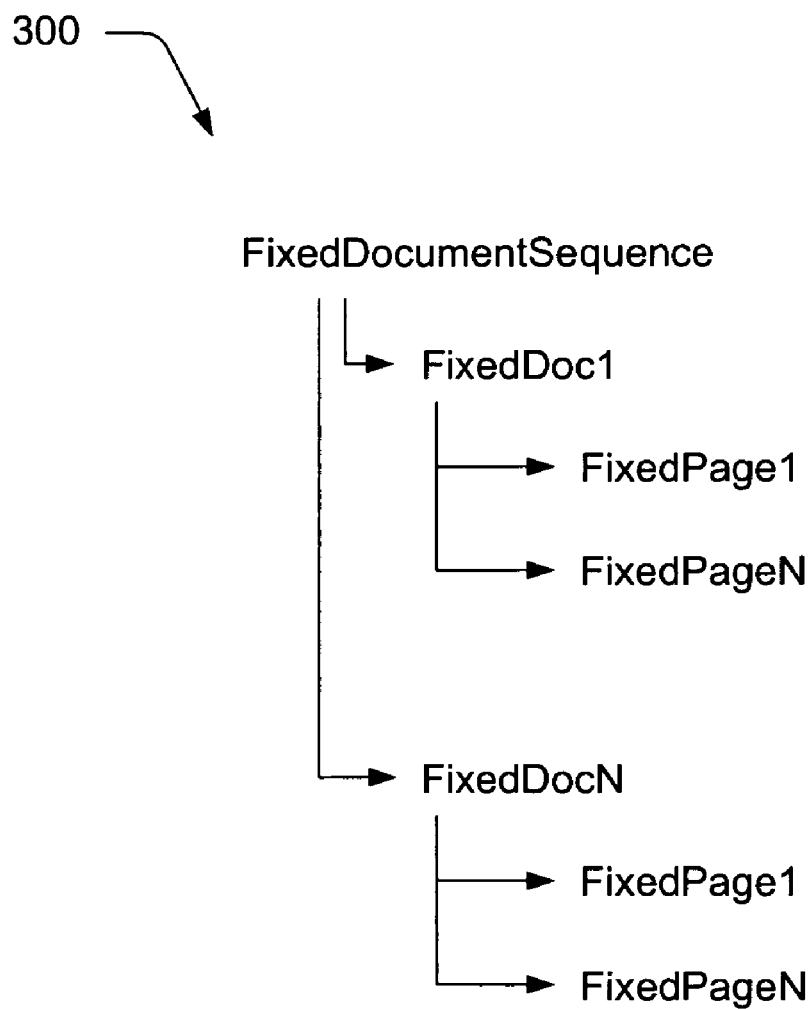
FIG. 3 illustrates an example logical representation of an XPS document in accordance with one embodiment.

FIG. 3 illustrates an example logical representation of an XPS document generally at 300.

The FixedDocumentSequence part assembles a set of fixed documents within the fixed payload. For example, a printing client can assemble two separate documents, a two-page cover memo and a twenty-page report (both are Fixed-Document parts), into a single package to send to the printer.

The FixedDocumentSequence part is the only valid root of a fixed payload. Even if an XPS Document contains only a single fixed document, the FixedDocumentSequence part is still used. One FixedDocumentSequence part per fixed payload is required.

Fixed document sequence markup specifies each fixed document in the fixed payload in sequence, using <DocumentReference> elements. The order of <DocumentReference> elements determines document order and must be preserved by editing consumers. Each <DocumentReference> element should reference a FixedDocument part by relative URI.

The FixedDocument part is a common, easily indexed root for all pages within the document. A fixed document identifies the set of fixed pages for the document.

The markup in the FixedDocument part specifies the pages of a document in sequence using <PageContent> elements. The order of <PageContent> elements determines page order and must be preserved by editing consumers. Each <PageContent> element should reference a FixedPage part by relative URI.

The FixedPage part contains all of the visual elements to be rendered on a page. Each page has a fixed size and orientation. The layout of the visual elements on a page is determined by the fixed page markup. This applies to both graphics and text, which is represented with precise typographic placement. The contents of a page are described using a powerful but simple set of visual primitives.

Each FixedPage part specifies the contents of a page within a <FixedPage> element using <Path> and <Glyphs> elements (using various brush elements) and the <Canvas> grouping element. The <ImageBrush> and <Glyphs> elements (or their child or descendant elements) can reference Image parts or Font parts by URI. They should reference these parts by relative URI.

XPS Document markup is an XML-based markup language that uses elements, attributes, and namespaces. The schema for XPS Document markup includes only elements and their attributes, comments, and whitespace. Arbitrary character data intermingled in the markup is not allowed.

Fixed page markup is expressed using elements and attributes and is based on a higher-level abstract model of contents and properties. Some fixed page elements can hold "contents," which are expressed as child elements. Properties may be expressed either as attributes or child elements.

XPS Document markup also uses resources and resource dictionaries, which allow elements to share property values.

With regard to the content representation of an XPS document, consider the following.

XPS Documents contain a root fixed document sequence that binds a collection of fixed documents which, in turn, bind a collection of fixed pages. All page markings are specified with <Glyphs> or <Path> elements on the fixed page. These elements can be grouped within one or more <Canvas> elements. Page markings are positioned by real-number coordinates in the coordinate space of the fixed page. The coordinate space can be altered by applying a render transformation.

The <FixedDocumentSequence> element contains one or more <DocumentReference>elements. The order of <DocumentReference> elements must match the order of the documents in the fixed document sequence. Accordingly, manipulations at this point can include changing the order of the elements to create a mismatch.

The <DocumentReference> element specifies a FixedDocument part as a URI in the Source attribute. Producers must not produce a document with multiple <DocumentReference> elements that reference the same fixed document. Accordingly, one manipulation at this level might be to reference the same fixed document with multiple <DocumentReference> elements.

The <FixedDocument> element contains one or more <PageContent> elements. The order of <PageContent> elements must match the order of the pages in the document.

Each <PageContent> element refers to the source of the content for a single page. The number of pages in the document can be determined by counting the number of <PageContent> elements. The <PageContent> element has one allowable child element, <PageContent.LinkTargets>, and it must not contain more than a single child element. Producers must not produce markup where a <PageContent> element references the same fixed page referenced by any other <PageContent> element in the entire XPS Document, even in other fixed documents within the fixed payload.

The <PageContent.LinkTargets> element defines the list of link targets that specify each named element on the page that may be addressed by hyperlink.

The <LinkTarget> element specifies a Name attribute, which corresponds to a named location within the fixed page specified by its parent <PageContent> element. By encapsulating this information in the fixed document, consumers do not need to load every FixedPage part to determine if a particular Name value exists in the document.

The <FixedPage> element contains the contents of a page and is the root element of a FixedPage part. The fixed page contains the elements that together form the basis for all markings rendered on the page: <Paths>, <Glyphs>, and the optional <Canvas> grouping element.

The fixed page must specify a height, width, and default language. The coordinate space of the fixed page is composable, meaning that the marking effects of its child and descendant elements are affected by the coordinate space of the fixed page.

Additional markup elements of the XPS document and their descriptions can be found in the specification, referenced above. It is to be appreciated and understood that any of the manipulations can be applied to the markup described above and in the XPS specification. Such manipulations can be applied to change the overall semantics of the markup of the XPS document.

Having discussed XPS and the XPS document format, consider now a discussion of an example XPS Analyzer tool.

Example XPS Analyzer

Figure 4:
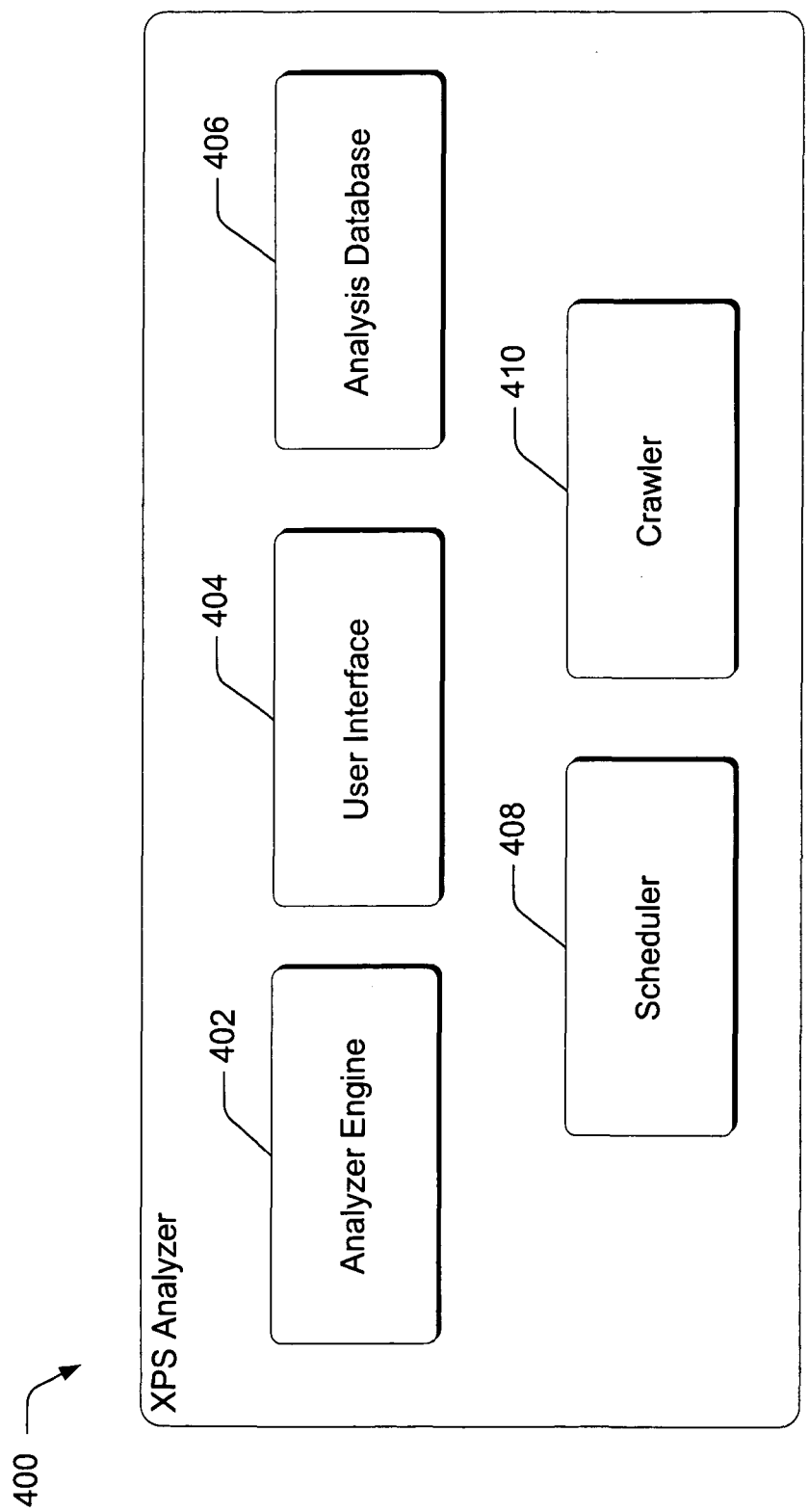
FIG. 4 illustrates an example XPS Analyzer in accordance with one embodiment.
Figure 5:
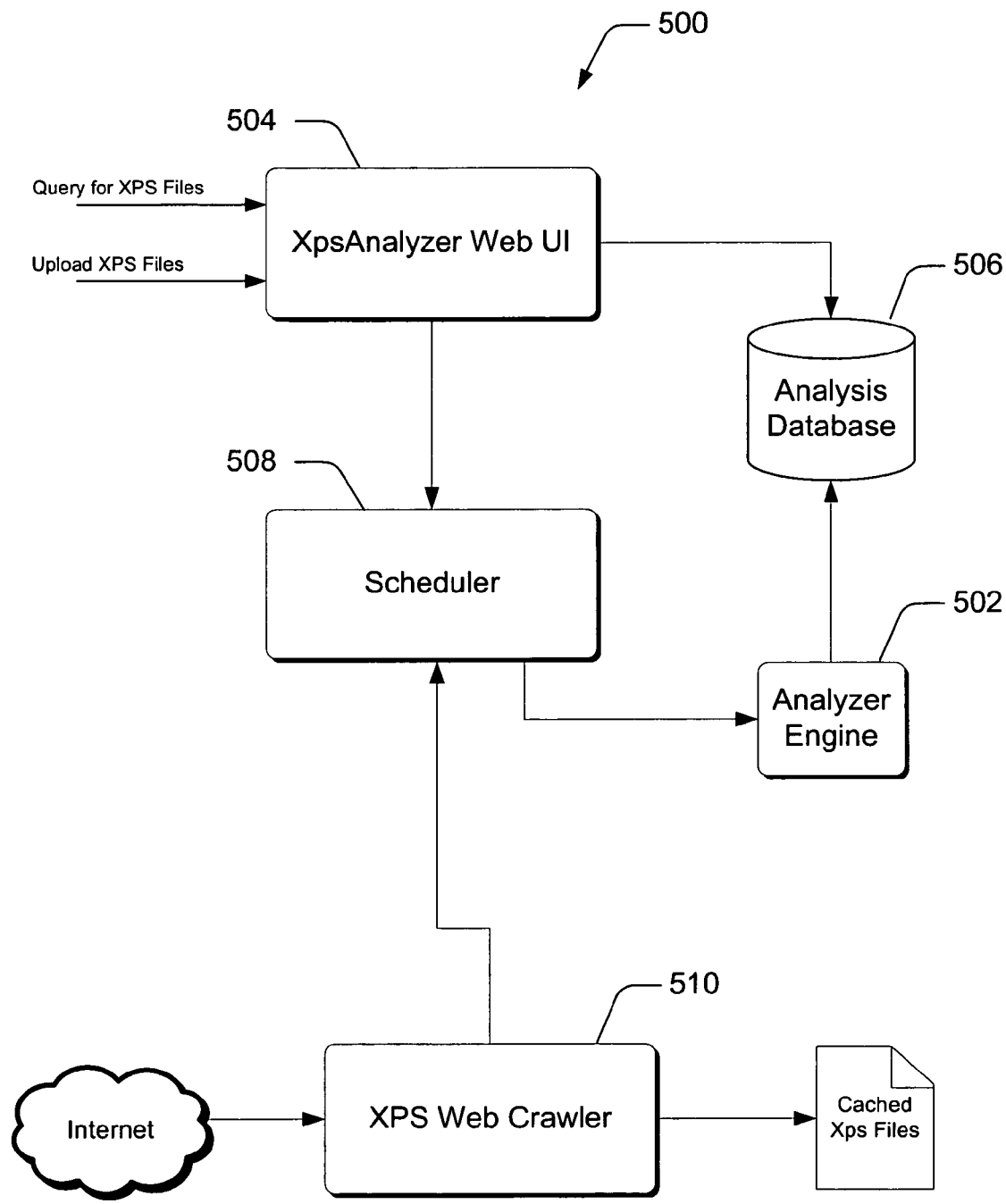
FIG. 5 shows an example implementation of an XPS Analyzer in accordance with one embodiment.

FIG. 4 shows an example structure of an XPS Analyzer in accordance with one embodiment generally at 400. The XPS Analyzer 400 includes several components including but not limited to an Analyzer Engine 402, a User Interface 404, an Analysis Database 406, a Scheduler 408, and a Crawler 410.

In one or more embodiments, the Analyzer Engine 402 is responsible for analyzing XPS and OPC files throughout a stack, including XPS, OPC, ZIP, and Digital Signature levels. In addition, the Analyzer Engine 402 stores analysis results in the Analysis Database 406. The User Interface 404 is utilized in querying for specific XPS files and in uploading files for analysis. The Analysis Database 406 is employed for storing the results from the analysis of the Analyzer Engine 402. The Scheduler 408 is a service that schedules analysis runs for the pending XPS files. The Crawler 410 is used to retrieve XPS files over a network such as the Internet, and then analyze those files in accordance with the analysis of the Analyzer Engine 402.

It is to be appreciated and understood that the described structure is shown as an example only. Accordingly, other physical representations can be utilized without departing from the spirit and scope of the claimed subject matter.

Implementation Example

Having described an example XPS Analyzer, consider now an example of an XPS Analyzer in operation. In accordance with the described embodiments, an architectural example of the XPS Analyzer, including example relationships between various components, is shown generally at 500. In the illustrated and described example, the architectural example includes an analyzer engine 502, an XPS Analyzer Web User Interface (UI) 504, an analysis database 506, a scheduler 508, and an XPS Web Crawler 510.

In operation, a user may query for XPS files using XpsAnalyzer Web UI 504. The XpsAnalyzer Web UI 504 then queries Analysis Database 506 to retrieve a list of XPS files that match the user's query. The Analysis Database 506 contains data output from the Analyzer Engine 502. Accordingly, the user's query returns those XPS files that have already been analyzed.

In an alternative implementation, a user can upload XPS files using the XpsAnalyzer Web UI 504. The XpsAnalyzer Web UI 504 saves the uploaded XPS files in the Analysis Database 506. In addition, the Scheduler 508 schedules an analysis run for the uploaded XPS files. Accordingly, Analyzer Engine 502 can analyze those XPS files scheduled for analysis.

In operation, a new database may be created or additions can be made to an existing database. To create a new database, a user runs the XPS Analyzer for every single XPS file that the user has. Alternatively, a user adds to an existing database by uploading a specific XPS file via the XpsAnalyzer Web UI 504. The scheduler 508 schedules an analysis run for the uploaded file and the Analyzer Engine 502 runs an analysis. After the analysis is completed, the Analyzer Engine 502 sends the resulting data to the Analysis Database 506 to be stored. By storing the data in the Analysis Database 506, the data can be easily retrieved to match another user's query for a particular XPS file.

In one embodiment, the XPS Web Crawler 510 can be used to search for XPS files publicly stored on the Internet. Every XPS file that the XPS Web Crawler 510 locates can be sent to the Scheduler 508. Following this, the Scheduler 508 schedules an analysis run for each file and the Analyzer Engine 502 analyzes those files. Accordingly, the analyzed XPS files are sent to an Analysis Database 506 and can also be cached by the Crawler 510.

Figure 6:
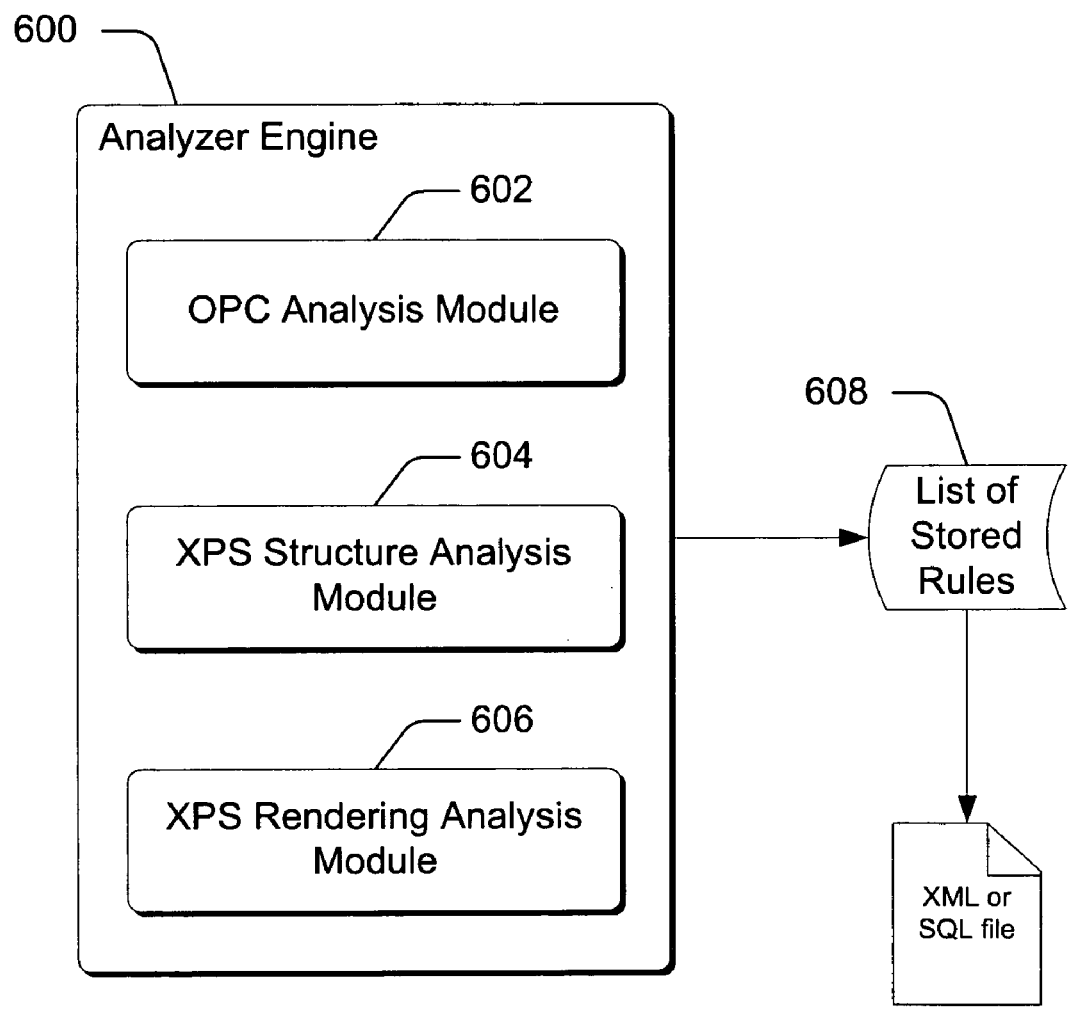
FIG. 6 illustrates an example Analyzer Engine in accordance with one embodiment.

FIG. 6 illustrates an example Analyzer Engine in accordance with one embodiment generally at 600. Using an XPS file as input, the Analyzer Engine 600 can perform canonicalization or mapping of XPS files into a set of predefined rules. In at least some embodiments, the set of predefined rules comprises different types of rules. For example, in at least some embodiments, the set of predefined rules may include XPS rules, OPC rules, Rendering rules, and/or Digital Signature rules.

In one or more embodiments, the Analyzer Engine 600 first analyzes the OPC structure using an OPC Analysis Module 602. In some embodiments, analysis of the OPC structure can be done by using any suitably configured object model and associated API that enables the analysis. By way of example and not limitation, the object model can use a Windows7 API. The OPC Analysis Module 602 creates a representation of the OPC file or structure in memory. The module deserializes the OPC file into a structure or tree that is then analyzed for compliance with one or more rules. From the analysis using the OPC Analysis Module 602, rules are then inserted into a List of Stored Rules 608 as an array or vector.

Additionally, the XPS structure is analyzed using an XPS Structure Analysis Module 604. In some embodiments, analysis of the XPS structure can be done by using a suitably configured object model and associated API that enables the analysis. This example embodiment uses, but is not limited to, the Windows7 API. The XPS Structure Analysis Module 604 creates an in-memory representation of XPS files and structures. The XPS Structure Analysis Module 604 operates similarly to the OPC Analysis Module 602 in that it deserializes the file into a structure or tree. Then, the module extracts information from the tree and inserts that information into a List of Stored Rules 608 as an array or vector. Everything in the XPS package from the fixed document sequence up to the content of the fixed page is analyzed using the XPS object model.

Further analysis of the XPS file is performed by an XPS Rendering Analysis Module 606, such as a rasterizer, to analyze XPS rendering features of the file. Any suitably configured rendering analysis model that enables analysis may be used, such as an XPS Rasterizer API; however, for example purposes, the XPS Rendering Analysis Module 606 uses, but is not limited to, the Windows7 API. Additionally, the Rendering Analysis Module 606 operates similarly to the OPC and XPS Analysis Modules in that it deserializes the file into a structure or tree. Then, the module extracts information from the tree and inserts that information into the List of Stored Rules 608 as an array or vector.

In one or more embodiments, one difference between the XPS Structure Analysis Module 604 and the XPS Rendering Analysis Module 606 is that the XPS Structure Analysis Module 604 in Windows 7 does not know or care about resources. By way of example, an XPS file can contain a font, but, from the standpoint of the XPS Structure Analysis Module 604, it does not matter whether that font is correct, valid, corrupt, or invalid. As long as there is some pointer to the font resources that indicates the font is valid, then from the perspective of the XPS Structure Analysis Module 604, the font is valid. In this manner, a properly valid XPS object model tree can be created while at the same time the file may be invalid from the rendering point of view. Therefore, the XPS Rendering Analysis Module 606 can check the validity of the representation in the file.

Many different rules can be used by the Analyzer Engine 600 during analysis of an XPS file. Some examples include but are not limited to: "Does the package contain a color profile?" or "Does the file have some type of complex brush?" Another example is "Does the package contain a radial gradient brush with a color profile resource?" Some lists of example rules are shown below. These lists include different categories of rules such as OPC, XPS Trunk, XPS Page, Digital Signature, and XPS Rendering.

Having described the embodiments above, consider a list of example rules below that can be used by the XPS Analyzer. These example rules are categorized as "OPC" rules and are used to analyze the OPC level in the XPS file.

| | | |
|---|---|---|
| CorruptedOpc | bool | Does the package conform with OPC Specification |
| PartCount | long | The total number of parts in the OPC file. |
| PackageRelationshipCount | long | The total number of relationships in the package |
| TotalPartRelationships | long | The total number of part relationships |
| MaxPartRelationships | long | The maximum number of relationships for a part of the package |
| MaxFileSizeInBytes | long | The maximum size of the set of parts |

-continued

| | | |
|---|---|---|
| LargePartCount | long | The number of parts whose size exceeds a specified amount |
| CompressionOption | string | The Compression option of the parts of the package |
| ForeignContentType | string | Content types that are not a part of the XPS spec |
| ForeignRelationshipType | string | Relationship types that are not a part of the XPS spec |

Now consider a list of example rules categorized as "XPS Trunk" shown below. These rules are used to analyze the trunk level of the XPS file.

| | | |
|---|---|---|
| CorruptedXpsTrunk | bool | Does the package conform with the XPS Specification (Trunk level) |
| HasCoreProperties | bool | Does the package contain Core Properties |
| HasDiscardControl | bool | Does the package contain Discard Control |
| PackageThumbnailType | string | Image type of the Package level thumbnail |
| HasJobPrintTicket | bool | Does the package contain DocumentSequence level PrintTicket |
| FixedDocumentCount | long | Total number of documents in the package |
| HasDocumentPrintTicket | bool | Does the package contain Document level PrintTicket |
| HasDocumentStructure | bool | Does the package contain Document Structure |
| HasMoreThanOneSignatureInADocument | bool | Does the package contain a document with more than one Signature |
| SignatureBlockRequestCount | long | Total number of Signatures in the package |

Consider further a list of example rules categorized as "XPS Page" that are used to analyze the Page level of the XPS file.

| | | |
|---|---|---|
| FixedPageCount | long | Total number of Page in the package |
| LinkTargetsCount | long | Total number of LinkTarget in the package |
| CorruptedXpsPage | bool | Does the package conform with the XPS Specification (Page level) |
| FontType | string | Font type found in the package |
| HasColorProfile | bool | Does the package contain ColorProfile |
| HasStoryFragment | bool | Does the package contain StoryFragment |
| HasPagePrintTicket | bool | Does the package contain Page level PrintTicket |
| HasRemoteDictionary | bool | Does the package contain a page that uses a RemoteDictionary |
| RemoteDictionaryContent | string | Type of Shareable Object found in this Remote Dictionary |
| LocalDictionaryContent | string | Type of Shareable Object found in this Local Dictionary |
| PageThumbnailType | string | Image type of the Page level thumbnail |
| PageDimension | string | Width and Height of a Page in the Package |
| HasNonDefaultContentBox | bool | Does the package contain a page with NonDefault ContentBox value |
| ContentBoxDimension | string | Dimension of NonDefault ContentBox in the package |
| HasNonDefaultBleedBox | bool | Does the package contain a page with NonDefault BleedBox value |

-continued

| | | |
|---|---|---|
| BleedBoxDimension | string | Dimension of NonDefault BleedBox in the package |
| PageLanguage | string | Language of the page |
| HasPageName | bool | Does the package contain a page with Name attribute set |
| HasHyperlinkTarget | bool | Does the package contain a page with Hyperlink target |
| HasLocalDictionary | bool | Does the package contain a page that uses a Local Dictionary |
| VisualCount | long | Total number of Visuals in the package |
| BrushCount | long | Total number of Brushes in the package |
| PathCount | long | Total number of Path in the package |
| HasPathTransformLocal | bool | Does the package contain a Path with local MatrixTransform |
| HasPathTransformRemote | bool | Does the package contain a Path with remote MatrixTransform |
| HasPathClipGeometryLocal | bool | Does the package contain a Path with local ClipGeometry |
| HasPathClipGeometryRemote | bool | Does the package contain a Path with remote ClipGeometry |
| HasPathOpacityEqualsOne | bool | Does the package contain a Path with Opacity = 1 |
| HasPathOpacityEqualsToZero | bool | Does the package contain a Path with Opacity = 0 |
| HasPathOpacityMaskBrushLocal | bool | Does the package contain a Path with local OpacityMaskBrush |
| HasPathOpacityMaskBrushRemote | bool | Does the package contain a Path with remote OpacityMaskBrush |
| PathOpacityMaskBrush | string | Type of Brush of the Path OpacityMask |
| HasPathName | bool | Does the package contain a Path with Name property |
| HasPathHyperlinkTarget | bool | Does the package contain a Path with HyperlinkTarget |
| PathLanguage | string | Language of the Path |
| HasPathGeometryRemote | bool | Does the package contain a Path with remote Geometry |
| HasPathGeometryLocal | bool | Does the package contain a Path with local Geometry |
| HasPathWithAccessibilityShortDescription | bool | Does the package contain a Path with AccessibilityShortDescription |
| HasPathWithAccessibilityLongDescription | bool | Does the package contain a Path with AccessibilityLongDescription |
| HasPathWithSnapsToPixel | bool | Does the package contain a Path with SnapToPixels |
| HasPathStrokeBrushLocal | bool | Does the package contain a Path with local StrokeBrush |
| HasPathStrokeBrushRemote | bool | Does the package contain a Path with remote StrokeBrush |
| PathStrokeBrush | string | Type of Brush of the Path Stroke |
| MaxStrokeDashesInAPath | long | The maximum number of StrokeDashes in a Path |
| PathStrokeDashCap | string | StrokeDashCap type of the Path |
| HasPathStrokeDashOffset | bool | Does the package contain a Path with StrokeDashOffset |
| PathStrokeStartLineCap | string | The cap style of the StartLine |
| PathStrokeEndLineCap | string | The cap style of the EndLine |
| PathStrokeLineJoin | string | The join style of the Line |
| HasPathWithNonDefaultStrokeMiterLimit | bool | Does the package contain a Path with a non default StrokeMiterLimit |
| HasPathWithNonDefaultStrokeThickness | bool | Does the package contain a Path with a non default StrokeThickness |
| HasPathFillBrushLocal | bool | Does the package contain a Path with local FillBrush |
| HasPathFillBrushRemote | bool | Does the package contain a Path with remote FillBrush |
| PathFillBrush | string | Type of Brush of the Path Fill |
| CanvasCount | long | Total number of Canvas in the package |
| HasCanvasTransformLocal | bool | Does the package contain a Canvas with local MatrixTransform |

-continued

| | | |
|---|---|---|
| HasCanvasTransformRemote | bool | Does the package contain a Canvas with remote MatrixTransform |
| HasCanvasClipGeometryLocal | bool | Does the package contain a Canvas with local ClipGeometry |
| HasCanvasClipGeometryRemote | bool | Does the package contain a Canvas with remote ClipGeometry |
| HasCanvasOpacityEqualsOne | bool | Does the package contain a Canvas with Opacity = 1 |
| HasCanvasOpacityEqualsToZero | bool | Does the package contain a Canvas with Opacity = 0 |
| HasCanvasOpacityMaskBrushLocal | bool | Does the package contain a Canvas with local OpacityMaskBrush |
| HasCanvasOpacityMaskBrushRemote | bool | Does the package contain a Canvas with remote OpacityMaskBrush |
| CanvasOpacityMaskBrush | string | Type of Brush of the Canvas OpacityMask |
| HasCanvasName | bool | Does the package contain a Canvas with Name property |
| HasCanvasHyperlinkTarget | bool | Does the package contain a Canvas with HyperlinkTarget |
| CanvasLanguage | string | Language of the Canvas |
| HasCanvasWithUseAliasedEdgeMode | bool | Does the package contain a Canvas with UseAliasedEdgeMode = True |
| HasCanvasWithAccessibilityShortDescription | bool | Does the package contain a Canvas with AccessibilityShortDescription |
| HasCanvasWithAccessibilityLongDescription | bool | Does the package contain a Canvas with AccessibilityLongDescription |
| GlyphsCount | long | Total number of Glyphs in the package |
| HasGlyphsTransformLocal | bool | Does the package contain a Glyphs with local MatrixTransform |
| HasGlyphsTransformRemote | bool | Does the package contain a Glyphs with remote MatrixTransform |
| HasGlyphsClipGeometryLocal | bool | Does the package contain a Glyphs with local ClipGeometry |
| HasGlyphsClipGeometryRemote | bool | Does the package contain a Glyphs with remote ClipGeometry |
| HasGlyphsOpacityEqualsOne | bool | Does the package contain a Glyphs with Opacity = 1 |
| HasGlyphsOpacityEqualsToZero | bool | Does the package contain a Glyphs with Opacity = 0 |
| HasGlyphsOpacityMaskBrushLocal | bool | Does the package contain a Glyphs with local OpacityMaskBrush |
| HasGlyphsOpacityMaskBrushRemote | bool | Does the package contain a Glyphs with remote OpacityMaskBrush |
| GlyphsOpacityMaskBrush | string | Type of Brush of the Glyphs OpacityMask |
| HasGlyphsName | bool | Does the package contain a Glyphs with Name property |
| HasGlyphsHyperlinkTarget | bool | Does the package contain a Glyphs with HyperlinkTarget |
| GlyphsLanguage | string | Language of the Glyphs |
| HasGlyphsUnicodeString | bool | Does the package contain a Glyphs with UnicodeString |
| MaxGlyphsIndicesInAGlyphs | long | The maximum size of Indices in a glyphs |
| MaxGlyphsMappingsInAGlyphs | long | The maximum size of Mappings in a glyphs |
| MaxGlyphsProhibitedCaretStopCountInAGlyphs | long | The maximum size of ProhibitedCaretStopCount in a glyphs |
| GlyphsBidiLevel | long | BidiLevel of the Glyphs |
| HasGlyphsWithSideways | bool | Does the package contain a Glyphs with IsSideways property enabled |
| HasGlyphsDeviceFontName | bool | Does the package contain a Glyphs with DeviceFontName |

| | | |
|---|---|---|
| GlyphsStyleSimulations | string | StyleSimulations of the Glyphs |
| MaxGlyphsFontRenderingEMSize | long | The maximum FontRenderingEmSize in a Glyphs |
| HasGlyphsFontFaceIndex | bool | Does the package contain a Glyphs with FontFaceIndex |
| HasGlyphsFillBrushLocal | bool | Does the package contain a Glyphs with local FillBrush |
| HasGlyphsFillBrushRemote | bool | Does the package contain a Glyphs with remote FillBrush |
| GlyphsFillBrush | string | Type of Brush of the Glyphs Fill |
| GeometryCount | long | Total number of Geometry in the package |
| GeometryFillRule | string | FillRule of the geometry |
| HasGeometryTransformLocal | bool | Does the package contain a geometry with local MatrixTransform |
| HasGeometryTransformRemote | bool | Does the package contain a geometry with remote MatrixTransform |
| GeometryFigureSegmentType | string | Segment Type of the GeometryFigure |
| GeometryFigureClosedFilledPatternRule | string | Is the GeometryFigure "ClosedAndFilled" or "ClosedAndNotFilled" or "NotClosedAndFilled" |
| GeometryFigureMaxSegmentCount | long | The maximum number of SegmentCount in GeometryFigures |
| GeometryFigureMaxSegmentDataCount | long | The maximum number of SegmentDataCount in GeometryFigures |
| GeometryFigureSegmentStrokePattern | string | Do the GeometryFigures have all/none/partial segmentstrokes |
| HasGeometryFigureWithMultipleSegmentTypes | bool | Does the package contain a GeometryFigure with multiple segment types |
| HasGeometryFigureWithNonDefaultStartPoint | bool | Does the package contain a GeometryFigure with non default StartPoint (0.0, 0.0) |
| SolidColorBrushCount | long | Total number of SolidColorBrush in the package |
| HasSolidColorBrushOpacityEqualsToOne | bool | Does the package contain a SolidColorBrush with Opacity = 1 |
| HasSolidColorBrushOpacityEqualsToZero | bool | Does the package contain a SolidColorBrush with Opacity = 0 |
| HasSolidColorBrushWithColorProfileResource | bool | Does the package contain a SolidColorBrush with ColorProfileResource |
| SolidColorBrushColorType | string | Color Type of the SolidColorBrush |
| SolidColorBrushContextColorChannelCount | string | Context Color Channel Count of the SolidColorBrush |
| VisualBrushCount | long | Total number of VisualBrush in the package |
| HasVisualBrushOpacityEqualsToOne | bool | Does the package contain a VisualBrush with Opacity = 1 |
| HasVisualBrushOpacityEqualsToZero | bool | Does the package contain a VisualBrush with Opacity = 0 |
| HasVisualBrushTransformRemote | bool | Does the package contain a VisualBrush with Remote MatrixTransform |
| HasVisualBrushTransformLocal | bool | Does the package contain a VisualBrush with Local MatrixTransform |
| HasVisualBrushWithNonDefaultViewBox | bool | Does the package contain a VisualBrush with a NonDefault ViewBox (0.0, 1.1) |
| HasVisualBrushWithNonDefaultViewPort | bool | Does the package contain a VisualBrush with a NonDefault ViewPort (0.0, 1.1) |
| VisualBrushTileMode | string | TileMode of the VisualBrush |
| HasVisualBrushWithRemotePath | bool | Does the package contain a VisualBrush with a Remote Path |
| HasVisualBrushWithRemoteCanvas | bool | Does the package contain a VisualBrush with a Remote Canvas |
| HasVisualBrushWithRemoteGlyphs | bool | Does the package contain a VisualBrush with a Remote Glyphs |

-continued

| | | |
|---|---|---|
| HasVisualBrushWithLocalPath | bool | Does the package contain a VisualBrush with a Local Path |
| HasVisualBrushWithLocalCanvas | bool | Does the package contain a VisualBrush with a Local Canvas |
| HasVisualBrushWithLocalGlyphs | bool | Does the package contain a VisualBrush with a Local Glyphs |
| ImageBrushCount | long | Total number of ImageBrush in the package |
| HasImageBrushOpacityEqualsToOne | bool | Does the package contain a ImageBrush with Opacity = 1 |
| HasImageBrushOpacityEqualsToZero | bool | Does the package contain a ImageBrush with Opacity = 0 |
| HasImageBrushTransformRemote | bool | Does the package contain a ImageBrush with Remote MatrixTransform |
| HasImageBrushTransformLocal | bool | Does the package contain a ImageBrush with Local MatrixTransform |
| HasImageBrushWithNonDefaultViewBox | bool | Does the package contain a ImageBrush with a NonDefault ViewBox (0.0, 1.1) |
| HasImageBrushWithNonDefaultViewPort | bool | Does the package contain a ImageBrush with a NonDefault ViewPort (0.0, 1.1) |
| ImageBrushTileMode | string | TileMode of the ImageBrush |
| HasImageBrushWithColorProfileResource | bool | Does the package contain a ImageBrush with ColorProfileResource |
| ImageBrushType | string | Image type of the ImageBrush |
| LinearGradientBrushCount | long | Total number of LinearGradientBrush in the package |
| HasLinearGradientBrushOpacityEqualsToOne | bool | Does the package contain a LinearGradientBrush with Opacity = 1 |
| HasLinearGradientBrushOpacityEqualsToZero | bool | Does the package contain a LinearGradientBrush with Opacity = 0 |
| MaxGradientStopsInALinearGradientBrush | long | The maximum number of GradientStops in a LinearGradientBrush |
| HasLinearGradientBrushWithNonDefaultGradientStopOffset | bool | Does the package contain a LinearGradientBrush with a NonDefault GradientStopOffset |
| HasLinearGradientBrushWithColorProfileResource | bool | Does the package contain a LinearGradientBrush with ColorProfileResource |
| LinearGradientBrushColorType | string | Color Type of the LinearGradientBrush |
| LinearGradientBrushContextColorChannelCount | string | Context Color Channel Count of the LinearGradientBrush |
| HasLinearGradientBrushTransformRemote | bool | Does the package contain a LinearGradientBrush with Remote MatrixTransform |
| HasLinearGradientBrushTransformLocal | bool | Does the package contain a LinearGradientBrush with Local MatrixTransform |
| LinearGradientBrushSpreadMethod | string | SpreadMethod of the LinearGradientBrush |
| LinearGradientBrushColorInterpolationMode | string | ColorInterpolationMode of the LinearGradientBrush |
| HasLinearGradientBrushWithNonDefaultStartPoint | string | Does the package contain a LinearGradientBrush with a NonDefault StartPoint |
| HasLinearGradientBrushWithNonDefaultEndPoint | string | Does the package contain a LinearGradientBrush with a NonDefault EndPoint |
| RadialGradientBrushCount | long | Total number of RadialGradientBrush in the package |
| HasRadialGradientBrushOpacityEqualsToOne | bool | Does the package contain a RadialGradientBrush with Opacity = 1 |
| HasRadialGradientBrushOpacityEqualsToZero | bool | Does the package contain a RadialGradientBrush with Opacity = 0 |
| MaxGradientStopsInARadialGradientBrush | long | The maximum number of GradientStops in a RadialGradientBrush |

| | | |
|---|---|---|
| HasRadialGradientBrushWithColorProfileResource | bool | Does the package contain a RadialGradientBrush with ColorProfileResource |
| RadialGradientBrushColorType | string | Color Type of the RadialGradientBrush |
| RadialGradientBrushContextColorChannelCount | string | Context Color Channel Count of the RadialGradientBrush |
| HasRadialGradientBrushWithNonDefaultGradientStopOffset | bool | Does the package contain a RadialGradientBrush with a NonDefault GradientStopOffset |
| HasRadialGradientBrushTransformRemote | bool | Does the package contain a RadialGradientBrush with Remote MatrixTransform |
| HasRadialGradientBrushTransformLocal | bool | Does the package contain a RadialGradientBrush with Local MatrixTransform |
| RadialGradientBrushSpreadMethod | string | SpreadMethod of the RadialGradientBrush |
| RadialGradientBrushColorInterpolationMode | string | ColorInterpolationMode of the RadialGradientBrush |
| HasRadialGradientBrushWithNonDefaultCenter | bool | Does the package contain a RadialGradientBrush with a NonDefault Center |
| HasRadialGradientBrushWithNonDefaultRadiiSizes | bool | Does the package contain a RadialGradientBrush with a NonDefault RadiiSizes |
| RadialGradientBrushEllipseOrCircle | string | Ellipse or Circle? |
| HasRadialGradientBrushWithNonDefaultGradientOrigin | bool | Does the package contain a RadialGradientBrush with a NonDefault GradientOrigin |

In addition, some rules are used to analyze the "Digital Signature." Such rules are used to determine, for example, how many signatures are in the file or whether the file conforms with a digital signature requirement. This category of rules can include the following:

| | | |
|---|---|---|
| CorruptedDigitalSignature | bool | Does the package conform with the DigitalSignature requirement |
| SignatureCount | long | Total number of Signatures in the package |

Another category of rules pertains to XPS Rendering, which is used to determine if the file is renderable. Rendering rules can include, for example:

| | | |
|---|---|---|
| CorruptedPageRendering | bool | Does the package contain a non-renderable Page |

Generally, the user will not see the above listed rules but will receive results of the XPS Analyzer having used such rules. In one or more embodiments, the results can be in the form of an XML, SQL, or HTML file, or the like. An example XML results file that a user might receive is shown directly below.

The above output file can be used in a variety of ways. For example, the output file can be used to conduct searches on previously-analyzed documents. Additionally and alternatively, the output file can be used to build an SQL database.

Figure 7:
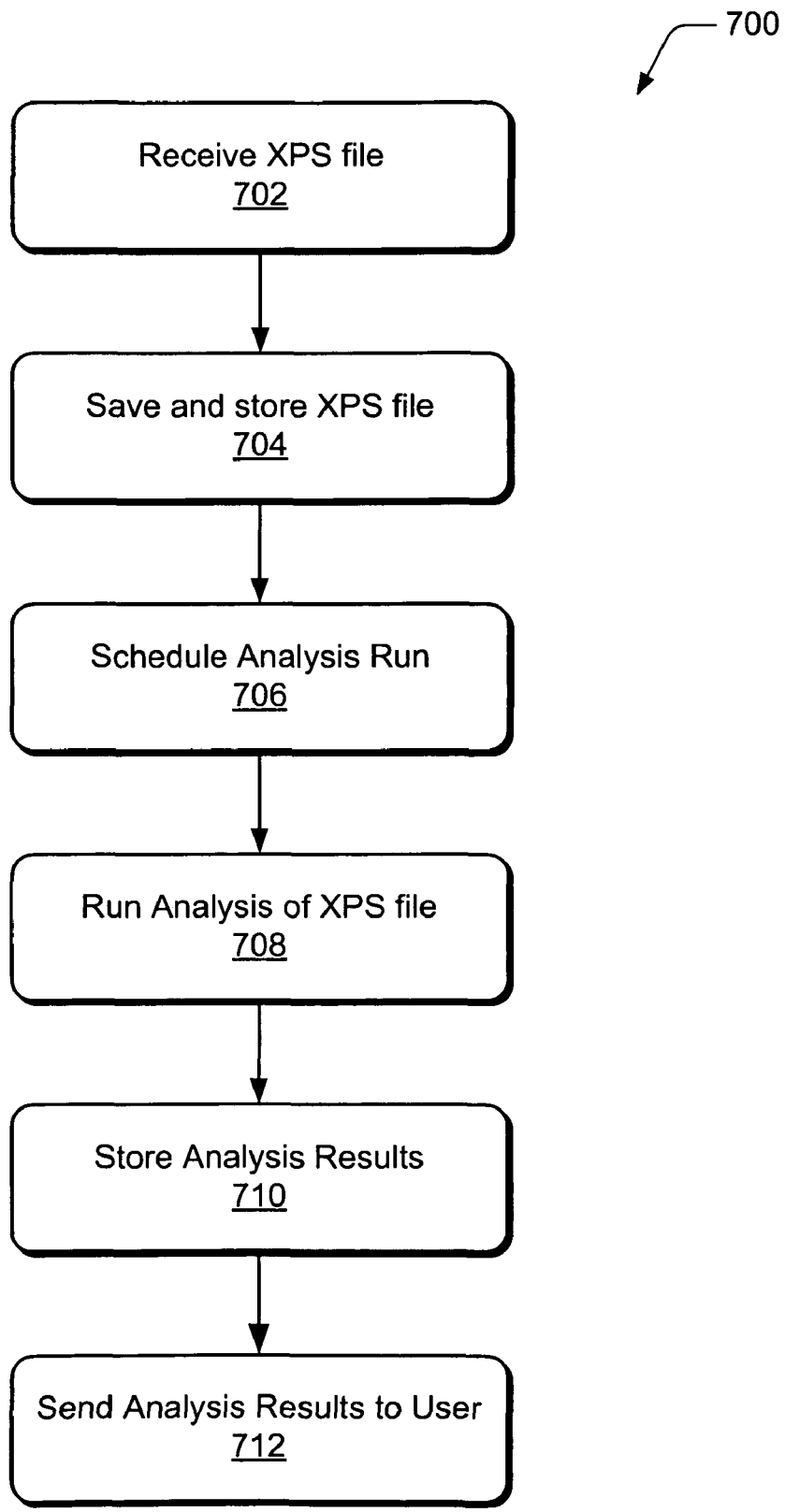
FIG. 7 is a flow diagram that describes steps in a method in accordance with one or more embodiments.

FIG. 7 is a flow diagram that illustrates steps in a method in accordance with one or more embodiments. The method can be implemented in connection with any suitable hardware, software, firmware or combination thereof. In at least some embodiments, the method can be implemented using a system such as the one described above. The order in which the method is described is not intended to be construed as a limitation, and any number of the described steps can be combined in any order to implement the method.

Step 702 receives an XPS file. This step can be performed in any suitable way. For example, in the example described above, this step can be performed using, at least in part, the XPS Analyzer Web UI. Step 704 saves and stores the XPS file. In the example described above, the file can be stored in the Analysis Database 506. Step 706 schedules an analysis run. Examples of how this can be done are described above. Once an analysis run is scheduled, step 708 runs an analysis on the XPS file. This step can be performed in any suitable way examples of which are provided above. For example, in at least some embodiments, the Analyzer Engine 502 can perform an analysis on the XPS file. The Analyzer Engine 502 can analyze the XPS file throughout a stack, including XPS, OPC, ZIP, and/or Digital Signature levels. Examples of how this can be done are described above. Step 710 stores analysis results for subsequent retrieval. This step can be performed in any suitable way. For example, in the embodiments described above, analysis results can be stored in the Analysis Database 504 where they can be subsequently retrieved. In at least some embodiments, step 712 sends analysis results to a user. Any suitable format can be used. For example, in at least some embodiments, analysis results can be sent in the form of an XML or SQL file.

Having described various embodiments in operation as well as methods of operation in general, consider now a description of an example system in which the described embodiments can be employed.

Example System

Figure 8:
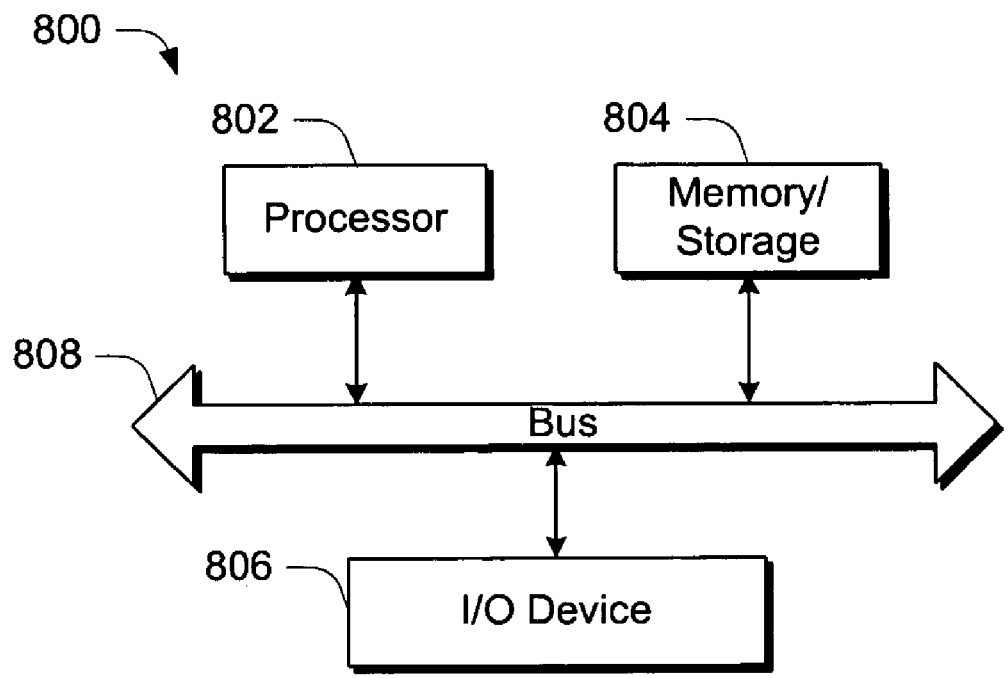
FIG. 8 is a block diagram of an example system that can be utilized to implement one or more embodiments.

FIG. 8 illustrates an example computing device 800 that can implement the various embodiments described above. Computing device 800 can be, for example, various computing devices or servers, such as those illustrated in FIG. 1 or any other suitable computing device.

Computing device 800 includes one or more processors or processing units 802, one or more memory and/or storage components 804, one or more input/output (I/O) devices 806, and a bus 808 that allows the various components and devices to communicate with one another. Bus 808 represents one or more of any of several types of bus structures, including a memory bus or memory controller, a peripheral bus, an accelerated graphics port, and a processor or local bus using any of a variety of bus architectures. Bus 808 can include wired and/or wireless buses.

Memory/storage component 804 represents one or more computer storage media. Component 804 can include volatile media (such as random access memory (RAM)) and/or non-volatile media (such as read only memory (ROM), Flash memory, optical disks, magnetic disks, and so forth). Component 804 can include fixed media (e.g., RAM, ROM, a fixed hard drive, etc.) as well as removable media (e.g., a Flash memory drive, a removable hard drive, an optical disk, and so forth).

One or more input/output devices 806 allow a user to enter commands and information to computing device 800, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Methods and systems provide a tool for searching and analyzing XPS files. In accordance with the described embodiments, a user can search and analyze XPS files without having a full understanding of an associated software development kit (SDK). Further, in at least some embodiments, the tool can load an XPS file, analyze XPS/OPC/ZIP metadata information, and store the metadata information into a set of predefined rules.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. One or more computer readable storage media comprising computer readable instructions which, when executed, implement a system comprising:
   an analyzer engine configured to analyze XML Paper Specification (XPS) files, wherein the analyzer engine is configured to receive the XPS files as input, map the XPS files into a set of predefined rules, and output the set of predefined rules, wherein the predefined rules comprise different types of rules comprising XML Paper Specification (XPS) rule types, Open Packaging Convention (OPC) rule types, rendering rule types and digital signature rule types;
   an analysis database configured to store analysis results, including the set of predefined rules, from the analyzer engine;
   a scheduler configured to schedule analysis runs for the XPS files; and a user interface configured to enable querying for the XPS files.

2. One or more computer readable storage media as recited in claim 1, wherein the analyzer engine comprises one or more modules configured to deserialize at least a portion of a file into a tree that is analyzed for compliance with one or more rule types.

3. One or more computer readable storage media as recited in claim 2, wherein one of the modules comprise an Open Packaging Convention (OPC) module.

4. One or more computer readable storage media as recited in claim 2, wherein one of the modules comprise an XML Paper Specification (XPS) structure analysis module.

5. One or more computer readable storage media as recited in claim 2, wherein one of the modules comprise an XML Paper Specification (XPS) rendering analysis module.

6. One or more computer readable storage media as recited in claim 2, wherein the one or more modules are configured to enable insertion of one or more rules into a list of stored rules as an array or vector.

7. A computer-implemented method comprising:
   receiving an XML Paper Specification (XPS) file;
   analyzing the XPS file by deserializing at least portions of the XPS file into a tree that is mapped to a set of predefined rules and is analyzed for compliance with the set of predefined rules, the set of predefined rules comprising one or more different types of rules, wherein rule types comprise an XML Paper Specification (XPS) rule type, an Open Packaging Convention (OPC) rule type, a rendering rule type and a digital signature rule type; and
   inserting the set of predefined rules into a list of stored rules as an array or vector.

8. The computer-implemented method of claim 7, wherein the receiving is performed, at least in part, using a web user interface.

9. The computer-implemented method of claim 7, further comprising sending analysis results to a user.

10. The computer-implemented method of claim 9, wherein the analysis results are in the form of an Extensible Markup Language (XML) file.

11. The computer-implemented method of claim 9, wherein the analysis results are in the form of an Structured Query Language (SQL) file.

12. The computer-implemented method of claim 9, wherein the analysis results are in the form of an Hypertext Markup Language (HTML) file.

* * * * *